(12) United States Patent
Gruber

(10) Patent No.: US 12,284,623 B2
(45) Date of Patent: *Apr. 22, 2025

(54) METHOD, SYSTEM AND APPARATUS FOR ELECTRONIC DEVICE ENROLLMENT

(71) Applicant: Universal Electronics Inc., Scottsdale, AZ (US)

(72) Inventor: Brandon Gruber, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,078

(22) Filed: Feb. 9, 2024

(65) Prior Publication Data
US 2024/0267868 A1 Aug. 8, 2024

Related U.S. Application Data

(62) Division of application No. 17/859,062, filed on Jul. 7, 2022, now Pat. No. 11,924,797, which is a division
(Continued)

(51) Int. Cl.
*H04L 61/4541* (2022.01)
*H04L 61/4511* (2022.01)
(Continued)

(52) U.S. Cl.
CPC ......... *H04W 60/00* (2013.01); *H04L 61/4511* (2022.05); *H04L 67/02* (2013.01);
(Continued)

(58) Field of Classification Search
CPC ....... H04W 60/00; H04W 8/22; H04W 84/12; H04W 84/18; H04W 88/02; H04W 88/08;
(Continued)

(56) References Cited

U.S. PATENT DOCUMENTS 9,130,859 B1    9/2015  Knappe
11,388,691 B2 *  7/2022  Gruber ................. H04W 60/00
(Continued)

*Primary Examiner* — Joseph E Dean, Jr.
(74) *Attorney, Agent, or Firm* — Greenberg Traurig, LLP

(57) ABSTRACT

A system, method and apparatus for automatically enrolling wireless end devices with a base station and/or other device or system. A wireless end device is scanned using a smart phone's native capabilities, without the use of a downloadable, third party app. Information from the scan indicates the name of the base station to which enrollment is desired. The base station name is used in an mDNS request in order to determine a local IP address of the base station. When the IP address is returned to the local, wireless communication device, the wireless communication device sends an HTTP GET message comprising attributes of the end device. The base station receives the HTTP GET message and enrolls the wireless end device with the base station. The base station my further alert another base station, system, server or other entity of the enrollment. The base station may then send the local, wireless communication device a web page indicating that the wireless end device was successfully enrolled with the base station and/or other base station, system, server or entity.

14 Claims, 5 Drawing Sheets

Related U.S. Application Data of application No. 16/732,234, filed on Dec. 31, 2019, now Pat. No. 11,388,691.

(51) Int. Cl.
    *H04L 67/02*     (2022.01)
    *H04W 8/22*     (2009.01)
    *H04W 60/00*     (2009.01)
    *H04L 12/28*     (2006.01)
    *H04W 84/12*     (2009.01)
    *H04W 84/18*     (2009.01)
    *H04W 88/02*     (2009.01)
    *H04W 88/08*     (2009.01)

(52) U.S. Cl.
    CPC ........... *H04W 8/22* (2013.01); *H04L 12/2803* (2013.01); *H04W 84/12* (2013.01); *H04W 84/18* (2013.01); *H04W 88/02* (2013.01); *H04W 88/08* (2013.01)

(58) Field of Classification Search
    CPC . H04L 61/4511; H04L 67/02; H04L 12/2803; H04L 61/4541
    See application file for complete search history.

(56) References Cited

U.S. PATENT DOCUMENTS

| | | |
|---|---|---|
| 2006/0268702 A1 | 11/2006 | Ali |
| 2010/0318563 A1 | 12/2010 | Deprun |
| 2012/0016975 A1 | 1/2012 | Rothschild |
| 2020/0404502 A1 | 12/2020 | Trivellato |

* cited by examiner

METHOD, SYSTEM AND APPARATUS FOR ELECTRONIC DEVICE ENROLLMENT

CROSS-REFERENCE TO RELATED APPLICATIONS

The present application is a divisional of U.S. patent application Ser. No. 17/859,062, filed on Jul. 7, 2022, which is a divisional of U.S. patent application Ser. No. 16/732,234, filed on Dec. 31, 2019.

BACKGROUND

Field of Use

The present application relates to the field of wireless monitoring and control technologies. More specifically, the present application relates to a method, apparatus and system for enrolling electronic devices into one or more monitoring and/or control systems.

Description of the Related Art

Wireless sensors are used to detect a wide variety of remote, physical conditions, such as the status of a door or window (i.e., open, closed), the occurrence of motion, the presence of heat, ambient temperatures, vibration, glass breakage, thermal readings, etc. Such sensors find widespread application in a variety of industries, including home security, home automation and industrial HVAC. These sensors are often wireless, battery-powered devices, enabling them to be placed in remote locations around a home or industrial setting.

Home automation and controllers have also become popular, including such things as lighting control devices (i.e., smart switches, Wi-Fi light bulbs, etc.), power outlet controls, irrigation controllers, entertainment devices, and integrated controllers (i.e., controllers found in washing machines, refrigerators, etc.).

Typically, a central controller, base station, hub, gateway, bridge or some other device is in communication with the sensors and/or controllers that make up a monitoring and/or control network, receiving information provided by sensors and providing control signals to controller devices. The base station may monitor the sensors and report an alarm signal to interested parties when one of the sensors is triggered. In a home control system, the base station may receive commands from a remote device, such as a smart phone, and cause one of the controller devices to perform an action, such as to turn a light on. The base station typically communicates with interested parties via a local-area network (such as a home Wi-Fi or Zwave® network) or a wide-area network (such as the Internet, or a cellular network). For example, home security systems usually comprise a base station in wireless communication with a number of door sensors, window sensors and motion sensors. When the system is armed and a door or a window is opened, or motion is detected, the base station receives a signal from one of the sensors and performs one or more actions in response, such as to cause a loud siren to sound via a local-area network or to contact a remote, central monitoring station via cellular or Internet-based communications.

Generally speaking, during setup, each sensor or control device must be "included", "enrolled" or otherwise "learned into" a base station, so that the base station knows the type and number of each sensor or control device in the network, and also so that no foreign sensor or control device can communicate with the base station. Such "inclusion" or "enrollment" typically involves complex actions by professional installers or consumers, such as to place the base station into a special "learn mode", then activate a sensor or control device to initiate a communication with the base station, and then, in some cases, manually enter information about the sensor or controller, such as a make, model and/or serial number. This process is often difficult to perform and time consuming, especially when large numbers of sensors or control devices are being installed.

With the advent of mobile phones, many security and control systems are set up by an app executed on a mobile phone or computer. The app typically makes the enrollment process easier, sometimes utilizing a bar code or QR code on each sensor or control device to more quickly and easily enroll sensors and control devices with base stations. However, before sensors or control devices can be added to a base station, a user must first locate and then download a third-party app to the user's smart phone, and then gain familiarity with the app in order to use it to enroll devices. On the app developer side, the app must be designed, created, tested, distributed, and updated periodically, which is expensive and time-consuming.

It would be desirable to more easily add devices to monitoring and control systems and, even more desirable, to do so without having to use a third-party app.

SUMMARY

The embodiments described herein relate to methods, systems, and apparatus for enrolling wireless end devices with a base station. In one embodiment, a method is described, comprising receiving, by a processor via a receiver coupled to the processor, a resource request message from a wireless communication device within a local-area network to provide a web-based resource response to the mobile communication device, the resource request message comprising attributes of the wireless end device for enrollment into the base station, wherein the attributes are scanned into the wireless communication device using only native functionality of the wireless communication device, in response to receiving the resource request message, determining, by the processor, whether to enroll the wireless end device into the base station, and providing, by the processor via the transceiver, a web-based resource response to the wireless communication device, the web-based resource response comprising an indication of whether the wireless end device was successfully enrolled into the base station or not.

In another embodiment, a base station is described for enrolling a wireless end device into the base station, comprising a transceiver for a transceiver for transmitting and receiving information with a local, wireless communication device, a memory for storing processor-executable instructions and for storing attributes of one or more wireless end devices after enrollment with the base station, and a processor coupled to the transceiver and the memory for executing the processor-executable instructions that causes the base station to receive a resource request message from the local, wireless communication device within a local-area network to provide a web-based resource response to the mobile communication device, the resource request message comprising attributes of the wireless end device for enrollment into the base station, wherein the attributes are scanned into the wireless communication device using only native functionality of the wireless communication device, in response to receiving the resource request message, determine whether to enroll the wireless end device into the base station, and provide a web-based resource response to the wireless communication device, the web-based resource response comprising an indication of whether the wireless end device was successfully enrolled into the base station or not.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to a system, method and apparatus for device inclusion, or enrollment, with one or more monitoring and/or control systems. While the remainder of this disclosure discusses an embodiment of the invention in the context of a home security system used in conjunction with a primary home monitoring and control system, it should be understood that the principles described herein could be used in other applications, such as in business or industrial applications, or in any application where wireless "end devices" are enrolled into a hub, gateway, bridge or other centralized control device. It should be understood that the term "base station", as used herein, refers to one of a variety of devices used to communicate with a network of sensors and/or control devices, such as a home security panel, bridge, gateway or hub, a home automation and control central controller, bridge, gateway or hub, or any central communication/control device that communicates with one or more wireless sensors and/or control devices. Further, the term "wireless end device" refers to any wireless electronic device where wireless communications with such a wireless end device either originate or terminate.

Figure 1:
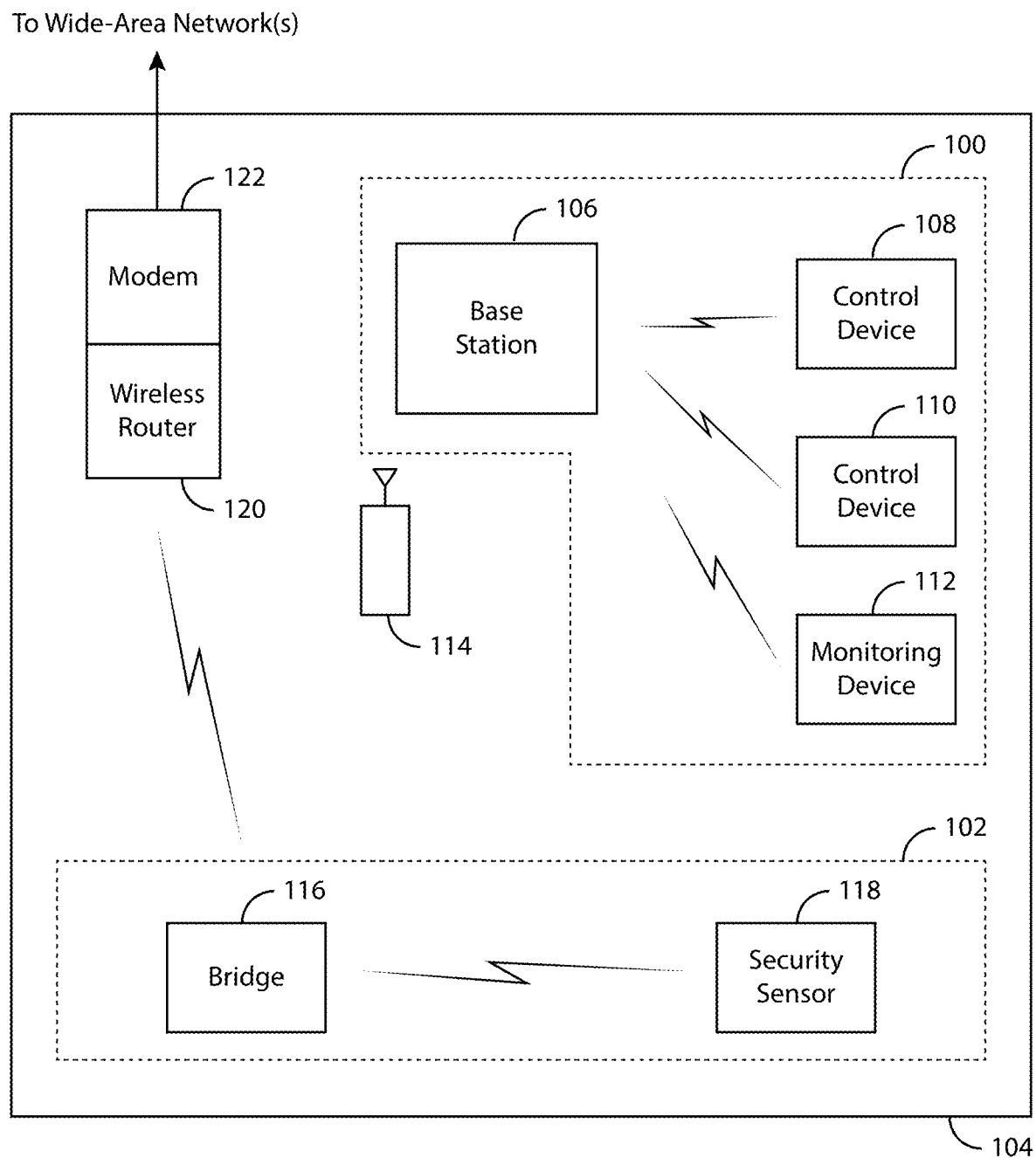
FIG. 1 is a block diagram of a primary monitoring and/or control system coupled to a secondary monitoring and/or control system.

FIG. 1 is a simplified block diagram of a primary monitoring and/or control system 100 coupled to a secondary monitoring and/or control system 102. Both systems are located within a home or business 104, with primary monitoring and/or control system 100, in one embodiment, used both to monitor events that may occur in and around home or business 104 as well as to provide automation and control of various devices or systems inside home or business 104. For example, primary monitoring and/or control system 100 may comprise a Homekit® home monitoring and control system from Apple® Incorporated of Cupertino, California. The Homekit system comprises a base station 106 in wireless communication with a number of end devices, such as control devices and/or monitoring devices, shown in FIG. 1 as control device 108, control device 110 and monitoring device 112. Base station 106 is capable of supporting many more control devices and monitoring devices than what is shown in FIG. 1.

Control device 108 may comprise a remote-controlled light switch while control device 110 may comprise a remote-controlled AC outlet. A wide variety of control devices are available today, many times incorporated into common household appliances, such as washing machines, refrigerators, toasters, and dishwashers, and also include devices such as lights, televisions, door locks and many others. Monitoring device 112 may comprise a digital video camera, a video doorbell, a motion detector, a thermometer, or some other device that allows users to monitor events that may occur inside and outside of home or business 104.

Users of primary monitoring and/or control system 100 can operate and control the control devices and monitoring devices using a local, wireless communication device 114, comprising a smart phone, tablet computer, desktop or laptop computer, a wearable device such as a smart watch, etc. that is coupled to the local-area network created by wireless router 120. Wireless communication device 114 may execute a software application or "app" used to control the control devices and monitoring devices in primary monitoring and/or control system 100 or access a website that allows such monitoring and control. The app is typically provided by the manufacturer of primary monitoring and/or control system 100.

Primary monitoring and/or control system 100 may allow third-party devices or systems, such as secondary monitoring and/or control system 102, to become part of primary monitoring and/or control system 100, where the devices or systems coupled to primary monitoring and/or control system 100 may be controlled using the app from the manufacturer of primary monitoring and/or control system 100. In one embodiment, secondary monitoring and/or control system 102 comprises a security system, although in other embodiments, secondary monitoring and/or control system 102 could comprise other control or monitoring devices or systems. For example, secondary monitoring and/or control system 102 may comprise a digital video camera or network of such cameras, an HVAC controller or HVAC system, a home entertainment device or a system that controls multiple home entertainment devices, etc.

Generally, secondary monitoring and/or control system 102, in this discussion, comprises a central control device, shown in FIG. 1 as base station 116 in communication with one or more security sensors, in this example a single security sensor 118 shown in FIG. 1. Only one security sensor is shown in FIG. 1 for purposes of clarity. In practical applications, base station 116 monitors a variety of different sensor types. Further, it should be understood that the term "bridge" may be used herein to describe any device that couples primary monitoring and/or control system 100 to end devices that are not directly compatible with protocols used by primary monitoring and/or control system 100.

Security sensor 118 may comprise a door or window sensor, used to determine when a door or a window is opened, a motion detector, used to detect when motion occurs in an area in proximity to security sensor 118, a garage door tilt sensor, to determine when a garage door is opened, a glass break sensor, used to detect a window being broken, or some other wireless sensing device typically used in security systems. Security sensor 118 is typically a battery-powered, wireless device, transmitting signals to base station 106 upon the occurrence of certain events, using one of a number of commercially-available communication technologies, such as Wi-Fi, Bluetooth, Zwave®, Zigbee®, or sub-gigahertz technologies generally used by professional security equipment providers such as Honeywell, DSC, Interlogix, etc. Base station 106 is generally capable of notifying a user when it receives a wireless communication from security sensor 118, and/or causing one or more actions to occur, such as sounding a local siren or notifying a remote monitoring company to dispatch police or fire authorities. Outside communications are generally provided through wireless router 120 and modem 122, coupled to one or more wide-area networks, such as a cellular data network and/or the Internet. Wireless router 120 may provide a wireless, local-area network within home or business 104, such as a Wi-Fi network.

Assuming that primary monitoring and/or control system 100 is operational, and before secondary monitoring and/or control system 102 has been introduced into home or office 104, a user typically first adds base station 116 to primary monitoring and/or control system 100. The primary monitoring and/or control system app running on wireless communication device 114 generally allows addition of other control devices, monitoring devices and systems. Base station 116 may be added to primary monitoring and/or control system 100 using the primary monitoring and/or control system app and techniques well-known in the art, such as entering a make and model into the app, scanning a bar code or QR code of a device using wireless communication device 114, or an automatic communication between base station 106 and base station 116, where base station 116 may transmit identification information, such as a make, model number, serial number, etc. to base station 106. In another embodiment, information for enrolling base station 116 into primary monitoring and/or control system 100 is provided to an Internet-based server relating to primary monitoring and/or control system 100, where the online server provides management and control of primary monitoring and/or control system 100 as well as to secondary monitoring and/or control system 102. Thus, including base station 116 may involve communication with the proprietary server, either by mobile communication device 114 or by base station 116 over a wide-area network such as the Internet.

Once base station 116 has been enrolled with primary monitoring and/or control system 100, the primary monitoring and/or control system app may provide an indication of the successful enrollment, such as an icon or a sound. After successful enrollment, security sensor 118 may then be enrolled with base station 116 and, in turn, one or more devices of primary monitoring and/or control system 100. Security sensor 118 generally must be "learned in", "included", "enrolled" or otherwise authorized to communicate with base station 116 before it can be used.

Security sensor 118 is enrolled with base station 116 using a bar code, QR code, or some other visually-identifiable symbol(s) that is on a surface of security sensor 118, or located on tags, labels, packaging or instructions that come with security sensor 118. The code is scannable using a native camera function found on almost any mobile phone or tablet. Neither the primary monitoring and/or control app or any other app is needed in order to enroll security sensor 118 with base station 116 and other devices of primary monitoring and control system 100.

In another embodiment, a visual code is not used. Instead, security sensor 118 comprises a near-field device, such as an RFID chip or NFC tag, that is readable by a native RFID or NFC reader function found in many smart phones or tablets in the marketplace today. Again, no app is needed to retrieve information stored on the RFID chip or NFC tag.

In any case, the code or near-field device on or within security sensor 118 comprises a universal resource locator (URL) that contains information in order to enroll security sensor 118. The URL comprises a domain name comprising a hostname of base station 116 followed by a ".local" extension for determining an IP address of base station 116 during the enrollment process. The URL may further comprise attributes of security sensor 118, such as a device type, a make, a model, an identification code such as a serial number, a communication protocol, a software version, a hardware version, etc. of security sensor 118.

When wireless communication device 114 scans the code or near-field device on or within security sensor 118 using its native capabilities, wireless communication device 114 first determines that the hostname in the URL must be resolved into a local IP address before the URL can be sent to wireless router 120, using techniques such as multicast DNS (mDNS). Once the IP address of base station 116 is known, wireless communication device constructs a resource request message, comprising at least some of the attributes of security sensor 118 as provided by the scan, the resource request message asking base station 116 to enroll security sensor 118 using the attributes provided in the resource request message. Base station 116 receives the resource request message and adds security sensor 118 as device that is authorized to communicate with base station 116, i.e., enrolls security sensor 118. Base station 116 then notifies primary monitoring and/or control system 100 that security sensor 118 has been enrolled with base station 116. After confirmation from one or more devices in primary monitoring and/or control system 100 of the enrollment of security sensor 118, base station 116 transmits one or more resources to wireless communication device 114, typically resources that allow wireless communication device 114 to render a webpage in a browser displayed by wireless communication device 114. The webpage contains an indication of whether security sensor 118 was successfully enrolled with base station 116 and/or primary monitoring and/or control system 100 or not.

Figure 2:
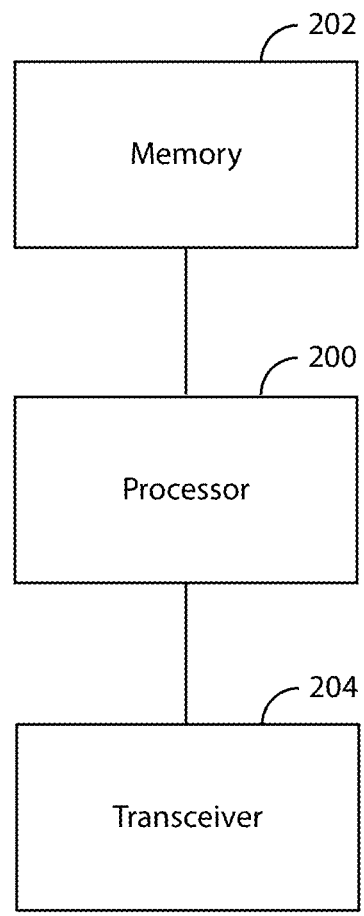
FIG. 2 is a functional block diagram of one embodiment of a base station as shown in FIG. 1, used to enroll one or more wireless end devices.

FIG. 2 is a block diagram of one embodiment of base station 116, configured to automatically enroll end devices such as sensors and/or monitoring devices, and to relay information from end devices to primary monitoring and/or control system 100. Specifically, FIG. 2 shows processor 200, memory 202, and transceiver 204. It should be understood that the functional blocks may be coupled to one another in a variety of ways, and that not all functional blocks necessary for operation of base station 116 are shown (such as a battery), for purposes of clarity.

Processor 200 is configured to provide general operation of base station 116 by executing processor-executable instructions stored in memory 302, for example, executable code. Processor 200 may comprise one or more general or specific-purpose processors, such as a MicroChip SAMA5D2 series ARM processor, although any of a variety of microprocessors, microcomputers, and/or microcontrollers may be used alternatively. Generally, processor 200 is selected based on factors such as power consumption, heat generation, size, and cost.

Memory 202 is coupled to processor 200 and comprises one or more information storage devices, such as RAM, ROM, flash, or other type of electronic, optical, or mechanical memory device. Memory 202 is used to store processor-executable instructions for operation of base station 116, as well as any information used by processor 200, such as information pertaining to any enrolled end devices (i.e., identification information such as serial numbers, node identification numbers, etc. for controllers, monitoring devices, etc.). In some embodiments, a portion of memory 202 is incorporated into processor 200.

Transceiver 204 is coupled to processor 200 and comprises circuitry necessary to wirelessly communicate with wireless router 120. In one embodiment, transceiver 204 comprises a Wi-Fi transceiver. Typically, a second transceiver is also used to communicate with enrolled controllers and/or monitoring devices.

Figure 3A:
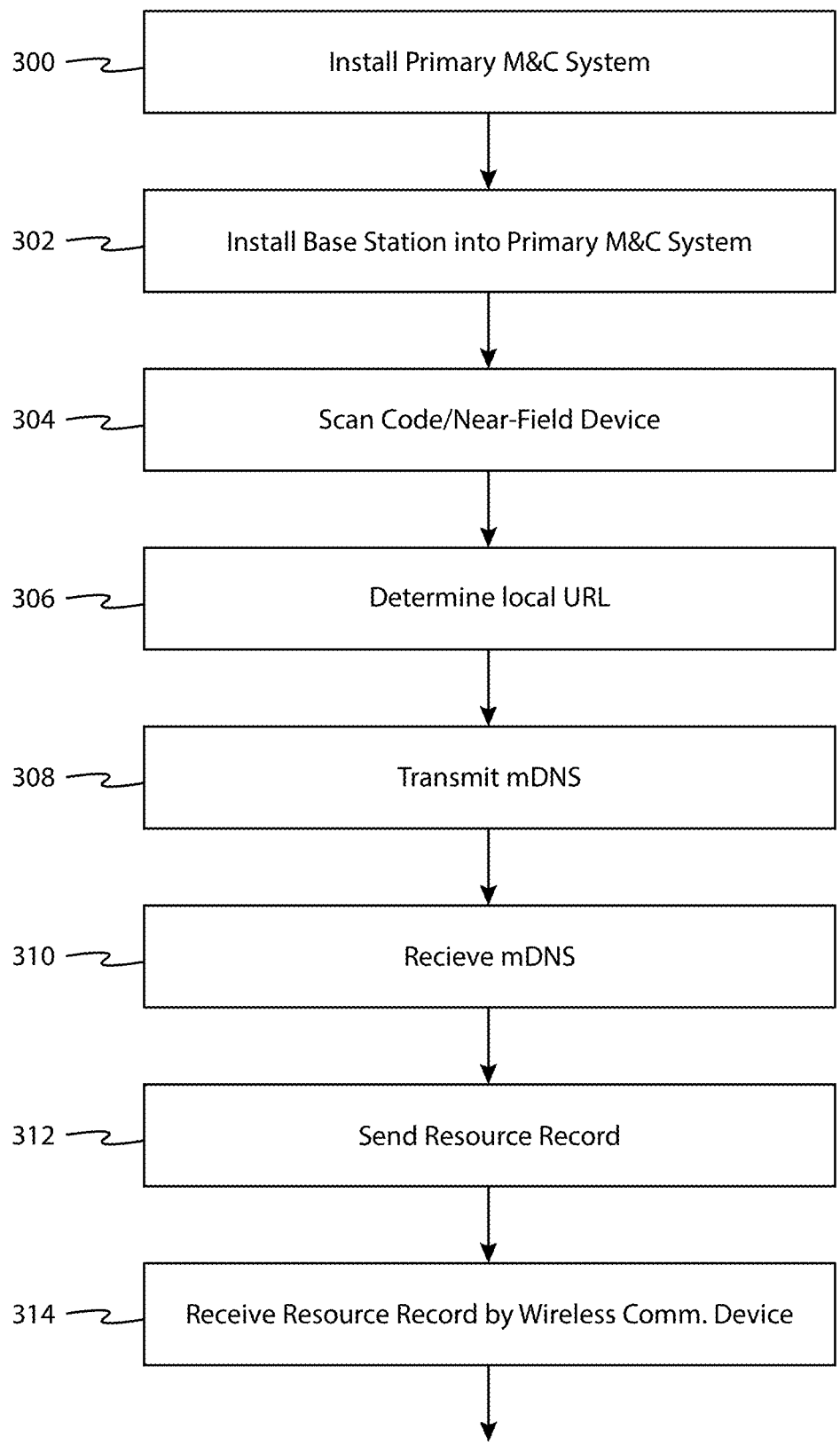
FIGS. 3A-3C represent a flow diagram illustrating one embodiment of a method, performed by the base station as shown in FIGS. 1 and 2, for enrolling one of the wireless end devices as shown in FIG. 1 with the primary system and the secondary system without the use of a downloadable software application.
Figure 3B:
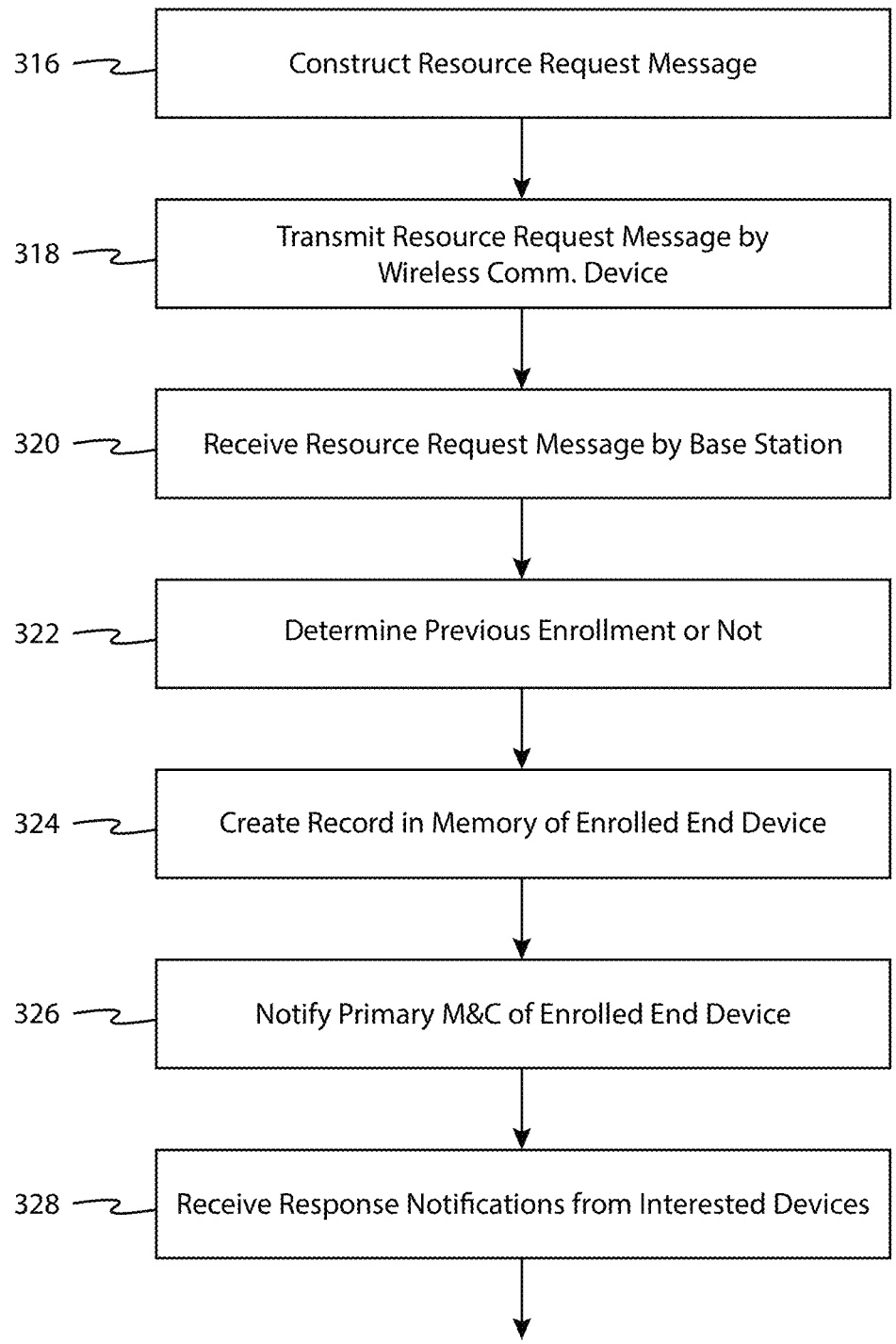
Figure 3C:
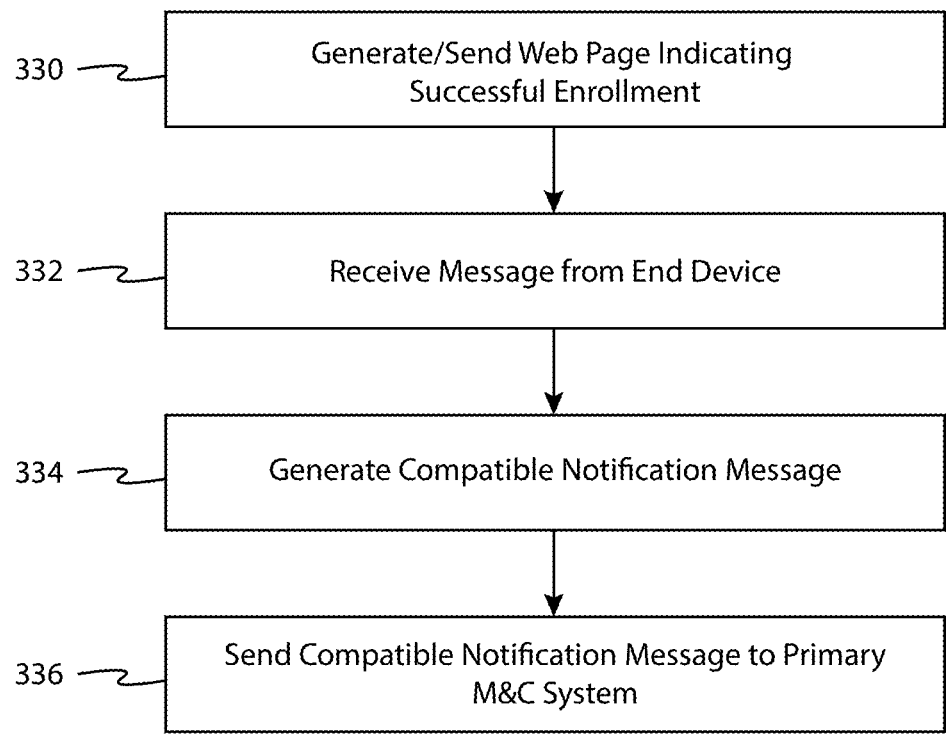

FIG. 3 is a flow diagram illustrating one embodiment of a method performed by base station 116 for automatically enrolling end devices such as controllers and monitoring devices with base station 116 and/or one or more devices of primary monitoring and/or control system 100 without the need for a third-party app. It should be understood that although the method is described in terms of a home security system comprising base station 116 and security sensor 118, the concepts described with respect to the method could be used in other types of systems and industries, where security sensor 118 could be any wireless end device. It should be understood that in some embodiments, not all of the steps shown in FIG. 3 are performed. It should also be understood that the order in which the steps are carried out may be different in other embodiments.

At block 300, primary monitoring and/or control system 100 is installed by a user, comprising base station 106 in communication with a number of controllers and/or monitoring devices. Typically, installation of base station 106 is performed in connection with an app running on wireless communication device 114. The app is created and maintained by a manufacturer of primary monitoring and/or control system 100, and generally directs a user to perform certain actions in order to set up primary monitoring and/or control system 100, such as creating an account, enrolling various controllers and/or monitoring devices with base station 106, and connecting base station 106 with an online server to help manage primary monitoring and/or control system 100.

At block 302, base station 116 is installed as an "add-on" system to primary monitoring and/or control system 100. Base station 116 may be manufactured by a different manufacturer than the manufacturer of primary monitoring and/or control system 100, and base station 116 may be certified to operate in cooperation with primary monitoring and/or control system 100.

Installation of base station 116 may be performed using the app on wireless communication device 114. The app may ask the user to select the type of device/system being installed, and then enroll base station 116 with primary monitoring and/or control system 100 so that primary monitoring and/or control system 100 now offers the capabilities of secondary monitoring and/or control system 102 via the app. Base station 116 may be enrolled with primary monitoring and/or control system 100 using traditional enrollment techniques, such as manual entry of information identifying base station 116, bar code or QR code scanning, etc. Typical prior art scanning techniques merely transmit identifying information from base station 116 to either base station 106 and/or the online server mentioned above, and then a notification is generated by the app when base station 116 has been successfully enrolled into primary monitoring and/or control system 100. The app controls all functionality of such scanning, transmission and notification, rather than utilizing native functionality of a smart phone, tablet or other wireless communication device.

At block 304, wireless communication device 114 is used to scan a code located on the surface of security sensor 118, a label, tag, instructions or packaging associated with security sensor 118, or a near-field device located on or within security sensor 118, such as an RFID chip or NFC tag. Wireless communication device 114 may be the same wireless communication device that was used to set up primary monitoring and/or control system 100, or it may be a different wireless communication device. In any case, scanning is performed using the native capabilities of wireless communication device 114, i.e., no third-party app (i.e., an app provided by the manufacturer of base station 116) is needed to perform scanning. Instead, scanning is performed using a camera or near-field circuitry normally built into wireless communication device 114 and controlled using operating system software of wireless communication device 114 to process the information obtained by the scan. For example, most modern smart phones comprise a camera that can scan a bar code or QR code using the camera's native software that comes with every smart phone and then open a web browser to display a web page in accordance with a URL embedded into the code or near-field device on or within security sensor 118.

At block 306, in one embodiment, wireless communication device 114 determines that the code or near-field device contains a universal resource locator (URL) that identifies a resource on the local-area network, i.e., a webpage from base station 116. For example, the URL may look like:

http://base_station.local/
   adddevice?serialnumber=188303AJ39&
   devicetype=01&protocol=clearsky Where:

"base_station.local" is a predetermined local domain name of base station 116. This domain name is stored in memory 202 of base station 116 during manufacturing of base station 116 and is chosen to uniquely identify base station 116 on the local-area network formed by wireless router 120. "base station" is the name, or hostname, of base station 116. The ".local" extension is a pseudo-top-level domain for hostnames in local area networks that can be resolved via the well-known Multicast DNS, or mDNS, name resolution protocol;

"adddevice" is a command for base station 116 to enroll security sensor 118 to base station 116 and/or primary monitoring and/or control system 100;

"serialnumber=188303AJ39" is a serial number of security sensor 118;

"sensortype=01" is a code indicating a type of device, in this case, 01 meaning a door or window security sensor. Other sensor types, such as motion detectors, would have a different code; and "protocol=clearsky" is the wireless protocol used by security sensor 118.

The serial number, sensor type, and wireless protocol are attributes of security sensor 118. In other embodiments, a greater, or fewer, number and types of attributes could be included in the URL.

The code or near-field device on or within security sensor 118 could, in one embodiment, comprises information of other end devices that are in need of enrollment with base station 116. For example, base station 116, security sensor 118 and a number of other security sensors may be sold together as a "kit". While security sensor 118 and the other security sensors may individually be enrolled with base station 116, this is a time consuming process for a user. Alternatively, in one embodiment, a single sensor or monitoring device in the kit, such as a door/window sensor, could comprise a code or near-field device that comprises information of each sensor and monitoring device in the kit, so that all of the sensors and/or monitoring devices in the kit can be enrolled with base station 116 upon a scan of only one of the sensors or monitoring devices. In a related embodiment, information of all of the sensors and monitoring devices may be encoded onto each device in the kit, including base station 116, and/or even on packaging or instructions included with the kit, so that all of the sensors and/or monitoring devices can be enrolled with a single scan of any of the sensors, monitoring devices or base station 116.

At block 308, in response to determining that a URL is contained in the code or near-field device, wireless communication device 114 transmits an mDNS request message to router 120, since wireless communication device 114 does not know the address of base station 116 on the local-area network. The mDNS request comprises at least the hostname of base station 116 obtained from the scan of security sensor 118. When two or more URLs are contained within a code or near-field device, the hostname of base station 116 should all be the same.

At block 310, processor 200 in base station 116 receives the mDNS request message from router 120 (as router 120 broadcasts the mDNS request to all devices on the local-area network) via transceiver 204, and checks to see if base station 116 is the intended recipient of the mDNS request message, by comparing the hostname in the request to base station 116's hostname stored in memory 202.

At block 312, if a match is found, processor 200 causes transceiver 204 to transmit a resource record, the resource record comprising, in one embodiment, base station 116's hostname (i.e., "base station"), a local IP address previously assigned to base station 116, and version information of the firmware stored in memory 202.

At block 314, wireless communication device 114 receives the resource record from base station 116 via router 120.

At block 316, wireless communication device 114 constructs a resource request message, comprising the received IP address of base station 116 and at least some of the attributes of security sensor 118. For example, in an HTTP environment, the resource request message comprises the following:
    GET    http://192.162.0.54/adddevice?serialnumber=
        188303AJ39& devicetype=01&protocol=clearsky As shown above, the resource request comprises an HTTP GET command and a URL comprising the local domain name of base station 116 (in this example, 192.168.0.54) and at least some of the attributes of security sensor 118.

The "adddevice" attribute of the resource request message requests enrollment of security sensor 118 with base station 116.

In a multi-URL case, i.e., where an end device comprises more than 1 URL, the resource request may include attributes of the other end devices. In other words, a single GET HTTP message may be generated when multiple URLs are found during the scan. For example, GET http://192.162.0.54/adddevice?serialnumber=188303AJ39&serialnumber=188303AJ40&devicetype=01&devicetype=02 . . . etc. Other methods could be used alternatively, such as by sending the attributes of each end device encoded in a base64 ascii url, i.e., GET http://192.162.0.54/addmultidevice?data=ABCDEFG1234567890 . . . etc. In yet still another embodiment, a resource request message is sent for each URL found in the code or near-field device of security sensor 118.

At block 318, wireless communication device 114 transmits the resource request message to base station 116 via router 120.

At block 320, processor 200 in base station 116 receives the resource request message from wireless communication device 114 via router 120 and transceiver 204.

At block 322, processor 200 determines whether security sensor 118 has previously enrolled with base station 116 by comparing one or more of the attributes of security sensor 118 contained in the resource request message. For example, processor 200 may check a serial number of security sensor 118 against a list of serial numbers of already-enrolled sensors and/or monitoring devices with base station 116. If the serial number is found, processor 200 generates a web-based resource response message to wireless communication device 114, typically a web page or resources of a web page, which causes wireless communication device 114 to render a webpage on a display of wireless communication device 114, such as a webpage indicating that security sensor 118 has already been enrolled with base station 116. If an error occurs when attempting to determine previous enrollment or not, processor 200 may generate a different web page, indicating that an error occurred, and send that web page to wireless communication device 114.

At block 324, when processor 200 determines that security sensor 118 has not previously been enrolled with base station 116, processor 200 may create a virtual device based on the information provided in the resource request message. In this example, processor 200 may store the serial number of security sensor 118 in a record of memory 202 in association with other device attributes, such as a description of the sensor type, the wireless protocol, version number, etc. Processor 200 may also assign another identification code to the record, based on an identification format of primary monitoring and/or control system 100. For example, processor 200 could assign an "instance ID" to security sensor 118 when primary monitoring and/or control system 100 is a HomeKit system, a Node ID when primary monitoring and/or control system 100 is a Zwave system, etc. In one embodiment, processor 200 then sends a web-based resource response message to wireless communication device 114 indicating that security sensor 118 was successfully enrolled with base station 116, i.e., a web page comprising an indication of successful enrollment. In some embodiments, the web page additionally comprises at least one of the attributes of security sensor 118. In one embodiment, where multiple URLs are provided to base station 116 for enrollment of multiple end devices at once, processor 200 may provide a single web page that comprises an indication for each end device of whether each end device was successfully enrolled or not, as well as attributes of each of the end devices.

At block 326, processor 200 notifies primary monitoring and/or control system 100 that a new device has been enrolled with base station 116. In one embodiment, each device in primary monitoring and/or control system 100 is provided with the notification, and any device that wishes to receive updates from base station 116 notifies base station 116, typically by providing base station 116 with an IP address associated with each device that wishes to receive future updates, such as when security sensor 118 generates an alarm signal, indicating that a door or window has been opened. In another embodiment, processor 200 notifies some other entity other than primary monitoring and/or control system 100, such as an online server dedicated to providing remote access to base station 116.

At block 328, processor 200 receives the notification(s) from the device(s) in primary monitoring and/or control system 100 (or from the dedicated online server mentioned above) and may store this information in association with the record pertaining to security sensor 118 stored in memory 202.

At block 330, in response to receiving at least one notification from at least one device in primary monitoring and/or control system 100 (or the dedicated server), processor 200 generates a web page, indicating that security sensor 118 has been successfully enrolled in base station 116 and/or primary monitoring and/or control system 100 (and/or the dedicated server). The web page may comprise an indication of successful enrollment, i.e., a graphic and/or textual representation and, in some embodiments, at least one of the attributes of security sensor 118, and is provided to wireless communication device 114 via wireless router 120, where it is rendered in a web browser and displayed to the user. Thus, security sensor 118 has been enrolled with base station 116 and also with one or more devices in primary monitoring and/or control system 100 (and/or with the dedicated server) without having to locate, download, and run an app from the manufacturer of security sensor 118, base station 116 or primary monitoring and/or control system 100.

At block 332, processor 200 may receive a message from security sensor 118, indicating that a door or a window has been opened.

At block 334, in response to receiving the message from security sensor 118, processor 200 generates a notification message that is compatible with primary monitoring and/or control system 100, using the alternative ID that was assigned to the record of security sensor 118 in memory 202.

At block 336, processor 200 causes transceiver 204 to transmit the notification message to any device that previously indicated a desire to receive future notifications or updates from base station 116 and/or security sensor 118.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method, performed by a base station, for enrolling a wireless end device into the base station, comprising:

receiving, by a processor via a transceiver coupled to the processor, a resource request message from a mobile communication device within a local-area network to provide a web-based resource response to the mobile communication device, the resource request message comprising attributes of the wireless end device for enrollment into the base station, wherein the attributes are scanned into the mobile communication device using only native functionality of the mobile communication device;

in response to receiving the resource request message, determining, by the processor, whether to enroll the wireless end device into the base station; and providing, by the processor via the transceiver, a web-based resource response to the mobile communication device, the web-based resource response comprising an indication of whether the wireless end device was successfully enrolled into the base station or not.

2. The method of claim 1, wherein determining whether to enroll the wireless end device into the base station comprises:

retrieving, by the processor via the transceiver, an identification code of the wireless end device from the resource request message;

determining if the identification code already exists in a memory coupled to the processor; and when the identification code does not already exist in the memory, storing, by the processor, the identification code of the wireless end device into the memory;

wherein the indication comprises a representation of the wireless end device being successfully enrolled into the base station.

3. The method of claim 1, wherein the resource request comprises a hyper-text transport protocol (HTTP) GET request and the web-based resource response comprises a web page, the web page comprising at least some of attributes of the wireless end device.

4. The method of claim 1, further comprising:

receiving, by the processor via the transceiver, a multicast domain name system (mDNS) request from the mobile communication device over the local area network, the mDNS request comprising an identification of the base station as provided by the wireless end device via the mobile communication device; and providing, by the processor via the transceiver, a resource record of the base station to the mobile communication device over the local area network.

5. The method of claim 2, further comprising:

providing, by the processor, at least some of the attributes to a primary monitoring and/or control system coupled to the base station.

6. The method of claim 1, wherein the resource request further comprises other attributes of other wireless end devices for enrollment into the base station as provided by the wireless end device, the method further comprising:

determining whether to enroll the other wireless end devices into the base station;

in response to determining whether to enroll the wireless end device and the other wireless end devices into the base station, generate the web-based resource response, wherein the web-based resource response comprises one or more indications of whether the other wireless end devices were successfully enrolled into the base station or not.

7. The method of claim 6, wherein determining whether to enroll the other wireless end devices into the base station comprises:

retrieving, by the processor, an identification code of each of the other wireless end devices from the resource request;

determining if any of the identification codes already exist in the memory; and when none of the identification codes of the other wireless end devices already exist in the memory, storing, by the processor, the identification code of the other wireless end device into the memory;

wherein the indication comprises one or more representations of the other wireless end device being successfully enrolled into the base station.

8. A base station for enrolling a wireless end device into the base station, comprising:

a transceiver for transmitting and receiving information with a mobile communication device;

a memory for storing processor-executable instructions and for storing attributes of one or more wireless end devices after enrollment with the base station; and a processor coupled to the transceiver and the memory for executing the processor-executable instructions that causes the base station to:

receive a resource request message from the mobile communication device within a local area network to provide a web-based resource response to the mobile communication device, the resource request message comprising attributes of the wireless end device for enrollment into the base station, wherein the attributes are scanned into the mobile communication device using only native functionality of the mobile communication device;

in response to receiving the resource request message, determine whether to enroll the wireless end device into the base station; and provide a web-based resource response to the mobile communication device, the web-based resource response comprising an indication of whether the wireless end device was successfully enrolled into the base station or not.

9. The base station of claim 8, further comprising additional processor-executable instructions that causes the processor to:

retrieve an identification code of the wireless end device from the resource request message;

determine if the identification code already exists in the memory; and when the identification code does not already exist in the memory, store the identification code of the wireless end device into the memory;

wherein the indication comprises a representation of the wireless end device being successfully enrolled into the base station.

10. The base station of claim 8, wherein the resource request comprises a hyper-text transport protocol (HTTP) GET request and the web-based resource response comprises a web page, the web page comprising at least some of attributes of the wireless end device.

11. The base station of claim 8, wherein the processor-executable instructions comprise further instructions that causes the processor to:

receive, by the processor via the transceiver, a multicast domain name system (mDNS) request from the mobile communication device over the local area network, the mDNS request comprising an identification of the base station as provided by the wireless end device via the mobile communication device; and provide, via the transceiver, a resource record of the base station to the mobile communication device over the local area network.

12. The base station of claim 9, wherein the processor-executable instructions comprise further instructions that causes the processor to:

provide at least some of the attributes to a primary monitoring and/or control system coupled to the base station.

13. The base station of claim 8, wherein the resource request further comprises other attributes of other wireless end devices for enrollment into the base station as provided by the wireless end device, wherein the processor-executable instructions comprise further instructions that causes the processor to:

determine whether to enroll the other wireless end devices into the base station;

in response to determining whether to enroll the wireless end device and the other wireless end devices into the base station, generate the web-based resource response, wherein the web-based resource response comprises one or more indications of whether the other wireless end devices were successfully enrolled into the base station or not.

14. The base station of claim 13, wherein the processor-executable instructions for determining whether to enroll the other wireless end devices into the base station comprise further instructions that causes the processor to:

retrieve an identification code of each of the other wireless end devices from the resource request;

determine if any of the identification codes already exist in the memory; and when none of the identification codes of the other wireless end devices already exist in the memory, store, by the processor, the identification code of the other wireless end device into the memory;

wherein the indication comprises one or more representations of the other wireless end device being successfully enrolled into the base station.

* * * * *